United States Patent [19]

Dark

[11] 4,440,327

[45] Apr. 3, 1984

[54] FLUID DISPENSING CLOSURE WITH INTEGRAL VALVE

[76] Inventor: Richard C. G. Dark, 8553 Red Hill Country Club Dr., Rancho Cucamonga, Calif. 91730

[21] Appl. No.: 331,162

[22] Filed: Dec. 16, 1981

Related U.S. Application Data

[63] Continuation-in-part of Ser. No. 228,212, Jan. 26, 1981, abandoned.

[51] Int. Cl.³ ............................................. B65D 25/46
[52] U.S. Cl. .................................... 222/530; 222/534
[58] Field of Search ............... 222/530, 534, 498, 528, 222/529, 517, 536, 531, 533, 532, 535, 526, 525, 211, 212, 464, 522, 214; 251/334

[56] References Cited

U.S. PATENT DOCUMENTS

| | | | |
|---|---|---|---|
| 1,800,127 | 4/1931 | Wilson | 251/334 |
| 2,893,612 | 7/1959 | Akers | 222/536 |
| 3,323,694 | 6/1967 | Stevens, Jr. | 222/498 |
| 3,511,420 | 5/1970 | Kessler | 222/525 |
| 4,047,643 | 9/1977 | Hazard | 222/534 X |

Primary Examiner—Stanley H. Tollberg
Attorney, Agent, or Firm—Boniard I. Brown

[57] ABSTRACT

A dispensing closure having a dispensing passage in an outlet spout is provided for use with an associated container. The unitary dispensing closure has a rigid base with a seal surface and latch surface, and a spout with a dispensing passage, a dispensing end and a first end connected with the base with seal means on the first end of the spout about the passage. The outlet spout is connected to the base by a hinge connected with an invertible diaphragm and by a second hinge interconnecting the invertible diaphragm to the base at a bi-sector plane. The diaphragm is in convexed configuration when the spout is in dispensing position and in concaved configuration when the spout is in sealed position, the spout in moving to sealed position pivoting about a pivot line, thus collapsing the invertible diaphragm through the bi-sector plane to seat the seal against the base seal surface and urge the dispensing end of the spout to abut the base latch surface in sealing relationship. Abutment on both ends of the spout provides positive sealing.

31 Claims, 19 Drawing Figures

FLUID DISPENSING CLOSURE WITH INTEGRAL VALVE

RELATED APPLICATIONS

This application is a continuation-in-part of application Ser. No. 228,212, filed Jan. 26, 1981 now abandoned.

BACKGROUND OF THE INVENTION

The invention relates to devices for selectively allowing and preventing passage of a fluent material from a container. Various devices have been provided for closing containers of fluent material and selectively allowing passage of the fluent material out of the container, one such device being shown in U.S. Pat. No. 3,181,743. Such devices have not been wholly satisfactory, at least in part because of reliance on deforming a molded dispensing spout in the sealed position, which is undesirable because the material is prone to taking a permanent set when stored in a sealed position for long periods.

U.S. Pat. No. 3,323,694 to Stevens relates to a closure mechanism which utilizes a spout which is inverted to maximize the use of available space in shipping cartons. A disadvantage of structures of this type is that they are not adapted to seal without the use of an additional cap or plug, the structures not sealing on inverting.

U.S. Pat. No. 2,893,613 to Akers shows a closure mechanism wherein a spout which is allowed to flex closed by a diaphragm comprising a depressed shallow portion, an upstanding wall, two side walls and a top wall section. In flexing closed, the depressed shallow portion and the upstanding wall move in an over-center toggle manner. However, no provision is made to allow the side walls or top wall section to move in an over center toggle manner, thus causing these sections to buckle and bend in a random manner which tends to force the spout to an upward or dispensing position. The integrity of this type of device is very poor and the life of its diaphragm is very limited.

Other closure devices utilize rigid structures which are separately molded and then assembled with a spout positioned in aligned relationship with an opening and a base to allow passage of fluent material. Such structures are relatively expensive to manufacture.

A major disadvantage of one piece closures that utilize a hinged cap molded in dispensing position (180 degrees from the face of the cap) is that a larger and less efficient molding machine is required, in order to provide double cavity area and clamp tonage.

An object of the invention is the provision of a dispensing closure and valve which overcomes the foregoing disadvantages and shortcomings.

An object of the invention to provide a device which is quick and convenient to operate.

An object of the invention is to provide a durable device which will continue to function satisfactorily even after many openings and closings.

It is an object of the invention to provide a device which will not take a set and will continue to function satisfactorily after long periods of storage.

Another object of the invention is to provide a device which will not leak under conditions which would cause prior sealing structures to leak.

Another object of the invention is to provide a device which may be molded and closed in one operation in the molding process without requiring any additional equipment or operation to close or assemble the closure.

Another object of the invention is to provide a device which will be relatively free of clogging by material accumulating in the spout and solidifying.

Another object of the invention is to provide a device which can be manufactured using known mass production techniques.

Another object of the invention is to provide a device which is less expensive than other devices which provide capabilities which are at all comparable.

SUMMARY OF THE INVENTION

The device of the invention is adapted to be manufactured by conventional and proven molding techniques in a mold which utilizes minimum mold space and clamp tonage to minimize manufacturing costs. When manufactured of a polyolefin plastic this dispensing cap takes full advantage of the characteristics of this family of plastics. In most polyolefin plastics flexural stiffness is related to thickness. Thick sections are relatively rigid, somewhat thinner sections are more resilient and thin sections are capable of extreme flexibility and are thus used as hinges. These characteristics are important to the present invention. Because the closure is made in one piece and requires minimum mold space, manufacturing costs are minimized.

The foregoing objects and other objects and advantages which shall become apparent from the detailed description of the preferred embodiment are attained in a unitary dispensing closure end device which includes a rigid outlet spout attached by hinges and an invertible diaphragm to a rigid base, the invertible surface being connected to the base by a hinge connection at a bi-sector plane. The spout has a dispensing passage, an end connected with the base, a dispensing second end, and seal means on the end connected with the base and about the dispensing passage. The outlet spout is connected to the base at a rectilinear pivot line, and has a hinge connection with the invertible diaphragm. A second hinge intersects the diaphragm and the base at the bi-sector plane, the second hinge and the pivot line forming a continuous hinge. The bi-sector plane bisects the angle between the base seal surface and an inside surface of the spout when the spout is in dispensing position. The invertible diaphragm is in convexed configuration when the spout is in dispensing position and in concaved configuration when the spout is in sealed position. In moving to sealed position the spout pivots accurately about the rectilinear pivot line to collapse the invertible diaphragm through the bi-sector plane to urge and seat the seal against the base seal surface and urge the dispensing end of the spout to abut the base latch surface. The components thus cooperate to provide positive, effective sealing. In the sealed configuration of the device, any pressure exerted by fluid in the associated container upon the inside surface of the invertible diaphragm and on the seal causes tighter sealing. The seal is preferably a cup seal of hollow configuration with its smaller end portion attached to an inside surface of the spout, and is resilient and compressible when engaging the base seal surface to compensate for irregularities in the seal surface and to act in the manner of a Belleville spring to urge the spout against the base latch surface.

The invertible diaphragm may be any combination of multi-faceted, conical or domed. The outlet spout may have various exterior configurations, and the dispensing passage therethrough may be round, oval, triangular or other cross-sectional configuration. The hinges are relatively thin sections of sufficient width and flexibility to allow inversion of the invertible diaphragm without impeding its movement.

The invertible diaphragm is stable and substantially unstressed in either its convexed or concaved configuration. It is stressed when being urged and flexed through the bi-sector plane during opening or closing, thus developing dynamic forces which exert pressure in the sealed position of the spout which holds the outlet spout seal against the seal surface of the base. The external force needed to lift the spout past the bi-sector plane produces dynamic forces in the diaphragm which urge the outlet spout toward the dispensing position. During closing, the invertible diaphragm inverts about the bi-sector plane on all sides into a concaved position, and urges the seal to engage the base seal surface.

The invertible diaphragm may be a hollow, conic or other section which has increased inside surface when in convexed configuration, so that upon exertion of pressure on the inside surface by fluid contents in the associated container, this larger area distributes the pressure along the bi-sector plane to increase seal seating pressure.

The outlet spout may have a projection extending to overlap a portion of the base to provide for convenient manual lifting of the spout from sealed position. The spout may have an inclined surface on its dispensing end to serve as a lead-in when the spout engages the base latch surface during closing.

The dispensing closure and valve device may preferably be molded in its dispensing configuration, and prior to ejection thereof from the mold a core may be retracted and a mold wipe traverse the outlet spout to pivot it through the bi-sector plane into the sealed position, thus to eliminate any secondary operation and to orient the molecules of the polyolefin plastic in the hinge areas to insure long life.

BRIEF DESCRIPTION OF THE ACCOMPANYING DRAWINGS

DESCRIPTION OF THE PREFERRED EMBODIMENT

Figure 1:
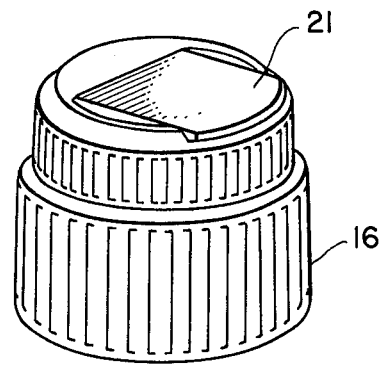
FIG. 1 is a perspective view of one form of closure in accordance with the invention, shown in sealed configuration.
Figure 2:
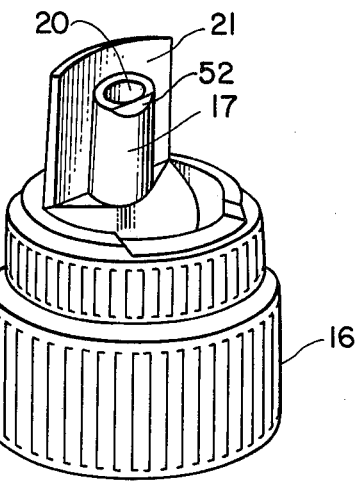
FIG. 2 is a perspective view of the closure illustrated in FIG. 1, shown in dispensing configuration.
Figure 3:
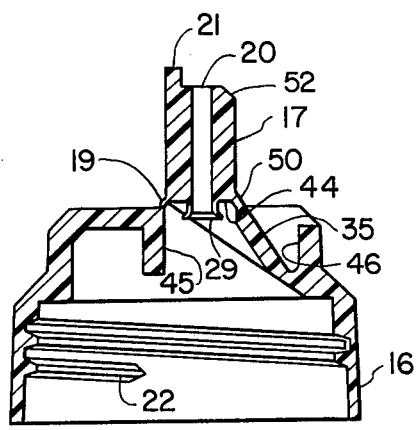
FIG. 3 is a sectional view, taken along a vertical plane, of the closure illustrated in FIG. 2 in its dispensing configuration.
Figure 4:
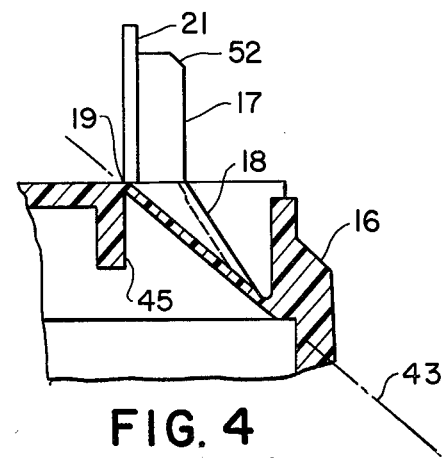
FIG. 4 is a partly diagrammatic view, similar to FIG. 3, showing the position of the bi-sector plane and illustrating the invertible diaphragm in a convexed position with the rigid outlet spout in the dispensing position.
Figure 5:
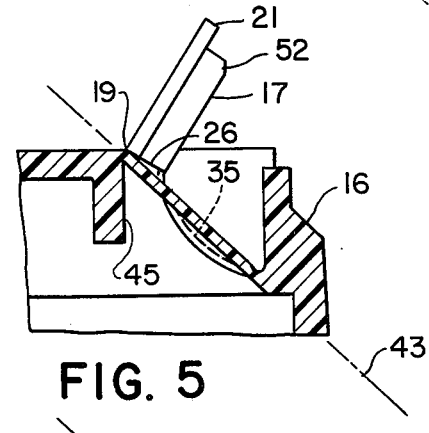
FIG. 5 is a partly diagrammatic sectional view similar to FIG. 4 showing the invertible diaphragm during inversion from a convexed to a concaved position through the bi-sector plane, and illustrating the geometric relationship with a partly sealed position of the rigid outlet spout.

Referring to FIGS. 1 through 6, there is shown a closure comprising a rigid base 16, a rigid outlet spout 17, a rectilinear pivot line 19 in a bi-sector plane hereinafter described, an outlet passage 20, and an invertible diaphragm 35. The rigid base 16 has an internal thread 22 for cooperation with a separate associated container (not shown) such as a plastic bottle.

Figure 7:
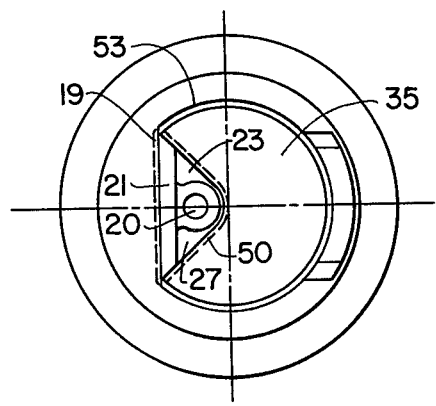
FIG. 7 is a plan view of the device illustrated in FIG. 2.
Figure 13:
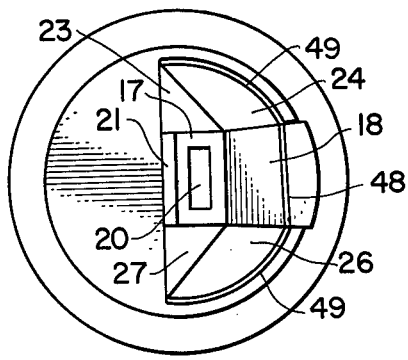
FIG. 13 is a plan view of the device illustrated in FIG. 10.

The base of the rigid outlet spout 17 is attached to the invertible diaphragm 35 by integrally formed hinges 50. The portion adjacent to sides 23, 27 of spout 17 may be rigid and is formed integral with the invertible diaphragm 35. All other portions of the invertible diaphragm 35 are resilient to enable the invertible diaphragm to invert. The invertible diaphragm is proximate to a bi-sector plane 43 which bisects the angle between an inside surface 44 of the rigid outlet spout, and a rigid base seal surface 45, when spout 17 is in the dispensing position and the invertible diaphragm is in a convexed configuration. The pivot line 19 lies in the bi-sector plane. The invertible diaphragm is connected with the rigid base by a hinge connection 53 (FIGS. 7 and 13). Hinge 53 and the pivot line 19 lie in the bi-sector plane, and in effect form a continuous hinge. The invertible diaphragm is connected with rigid spout 17 by a relatively thin hinge 50. The hinge 50 has sufficient width and flexibility to allow the invertible diaphragm to invert without significantly impeding its movement. During closing of the spout 17, movement being accurately governed by pivoting of the spout about the rectilinear pivot line, the invertible diaphragm inverts about the bi-sector plane 43 in the manner shown in FIGS. 10, 11, and 12, throughout the extent thereof to a concaved configuration. A cup seal 29 on inside surface 44 of rigid outlet spout 17 is thus urged to engage the rigid base seal surface 45 to complete sealing.

Figure 6:
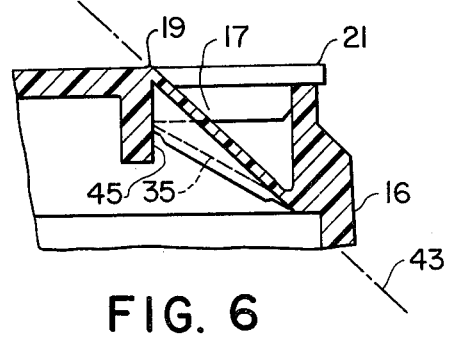
FIG. 6 is a sectional view similar to FIG. 4, showing the invertible diaphragm in a concaved position and the rigid outlet spout in the sealed position.
Figure 12:
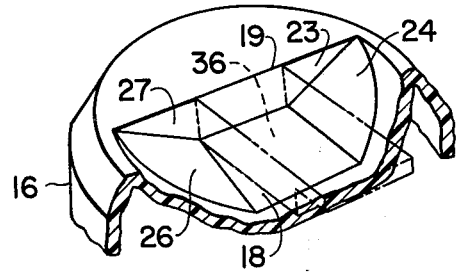
FIG. 12 is a broken away perspective view, in partial section, similar to that in FIG. 10, showing the invertible diaphragm to a concaved configuration.

Whether the invertible diaphragm is in its convexed configuration of FIGS. 2, 3, 4, 10, 14, 15, 16 and 17 or its concaved position of FIGS. 1, 6, and 12, it is stable and substantially unstressed, only being stressed when it is flexed through the bi-sector plane 43. Dynamic forces, developed during this flexing through the bi-sector plane 43, exert pressure in the closed position to urge the outlet spout seal 29 against the seal surface of the rigid base 45. Force is required to open the rigid outlet spout 17 by lifting it past the bi-sector plane 43, whereupon the dynamic forces built up in the invertible diaphragm urge the outlet spout 17 toward its dispensing position shown in FIG. 2.

Figure 8:
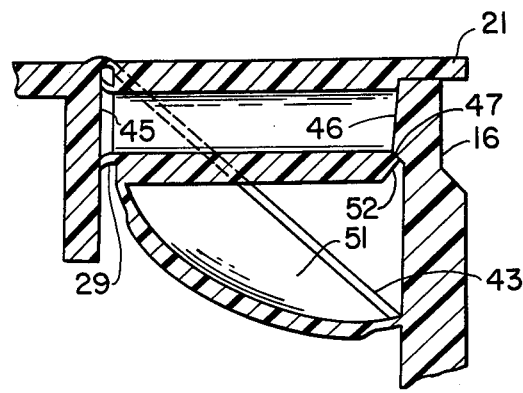
FIG. 8 is a fragmentary view of the device of FIG. 1, taken along the vertical plane of the closure in the sealed position, illustrating the positions of the seal and latch detent.
Figure 9:
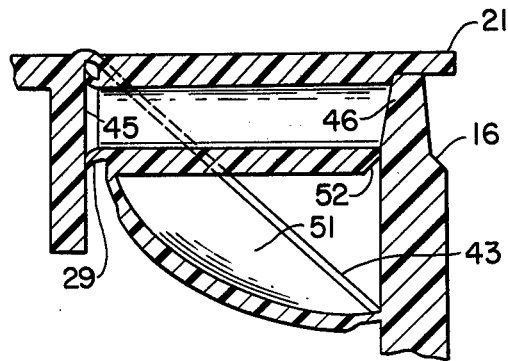
FIG. 9 is a fragmentary view similar to that of FIG. 8, illustrating the seal and an alternate latch arrangement.

To effect a positive pressure seal, it is preferable that both ends of the spout abut against the rigid base 16 when closing, as shown in FIGS. 6, 8, and 9. The cup seal 29 on the inside surface of the rigid outlet spout 17 compresses and deforms when the dispensing end of the rigid outlet spout 17 engages the rigid base latch surface 46, the seal acting in the manner of a Belleville spring, thereby providing a firm seating against the inside seal surface 45 and positive sealing.

FIGS. 8 and 9 show a rigid base latch surface 46 and the detent configuration of inclined portion 47 for securing the outlet spout 17 in the sealed position. The outlet spout 17 has an inclined surface 52 which serves as a lead-in upon contact with the rigid base latch surface 46 during closing. Although no detent is provided on the rigid base latch surface 46 of the embodiment shown in FIG. 9, the closing radius of the dispensing end of rigid outlet spout 17 causes the inclined surface 52 to engage the rigid base latch surface and snap into sealed position.

Figure 10:
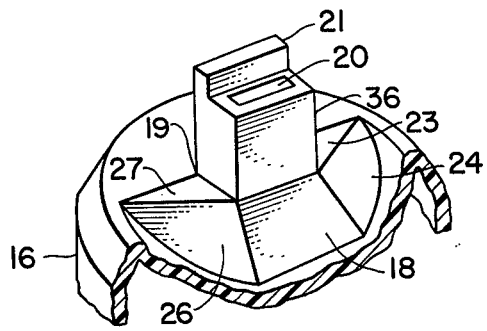
FIG. 10 is a broken away perspective view, in partial section, of another embodiment of the closure in the dispensing position, showing one form of the invertible diaphragm in a convexed position.
Figure 11:
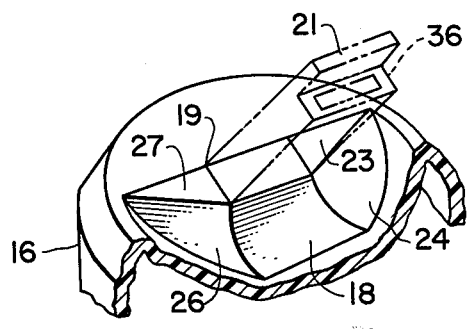
FIG. 11 is a broken away perspective view, in partial section, similar to the view of FIG. 10, showing the invertible diaphragm during inversion from a convexed configuration to a concaved configuration.

FIGS. 10 thru 13 show a form of the closure of the invention wherein an invertible diaphragm, comprising 27, 26, 18, 24 and 23, has an outlet spout 36 of rectangular cross-section. The rigid outlet spout 36 is connected to facets 26, 18 and 24 by hinge 50 and to the rigid base by hinge connections 19, 48, and 49. These facets cooperate to define the invertible diaphragm. When closing through the bi-sector plane 43, these facets collectively collapse to a concaved configuration, as is best shown in FIGS. 10, 11, and 12. FIG. 11 shows the invertible facets 26, 18, 24, 23, and 27 of the diaphragm collapsing collectively through the bi-sector plane 43.

Figure 14:
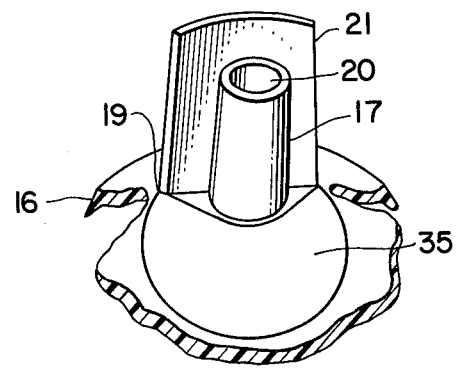
FIG. 14 is a broken away perspective view, in partial section, showing a conical shaped invertible diaphragm in accordance with another embodiment of the invention in the dispensing position.
Figure 15:
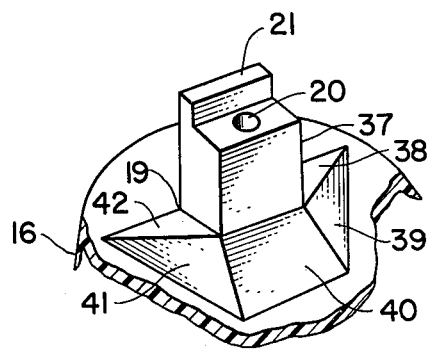
FIG. 15 is a broken away perspective view in partial section, showing a multi-faceted invertible diaphragm in accordance with another embodiment of the invention in the dispensing position.
Figure 16:
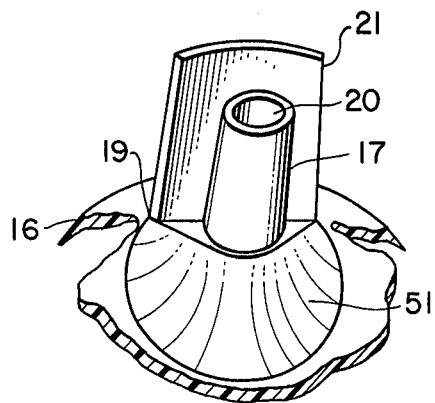
FIG. 16 is a broken away perspective view in partial section, showing a hollowed conical invertible diaphragm in accordance with another embodiment of the invention in the dispensing position.
Figure 17:
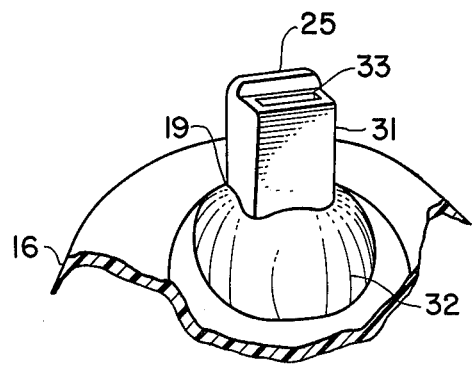
FIG. 17 is a broken away perspective view, in partial section, showing a domed shaped invertible diaphragm in accordance with another embodiment of the invention in the dispensing position.

FIG. 14 shows a conic invertible diaphragm, FIG. 15 shows a multi-faced invertible diaphragm, FIG. 16 shows a hollow conic section diaphragm, and FIG. 17 shows a domed conical section diaphragm 35, all of which diaphragms operate in the manner hereinbefore described to invert from a convexed to a concaved configuration.

FIG. 16 shows an invertible diaphragm in the form of a hollowed conic section. When it is in concaved configuration and the outlet spout is in sealing position, the geometry is not a mirror image, but has increased surface area on the inside surface. Therefore, when pressure is exerted upon it by the fluid contents within a container, the invertible diaphragm distributes this pressure along the bi-sector plane 43 which increases seating pressure on the cup seal 29.

FIG. 17 shows an alternate form of domed invertible diaphragm 32 which also collapses from a convexed position to a concave position when sealing.

Figure 18:
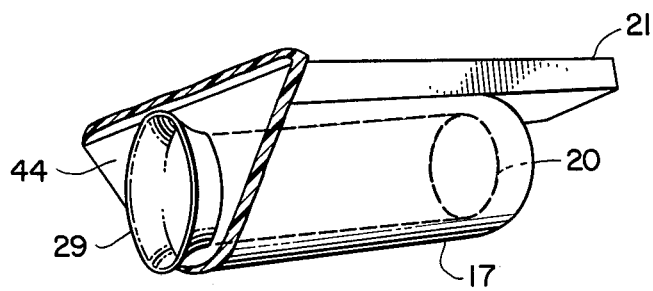
FIG. 18 is an enlarged partial perspective view, partially in section, showing details of the rigid outlet spout and cup seal.

The cup seal 29, best shown in FIG. 18, surrounds the dispensing passage 20 and is similar in shape to a suction cup. This type of seal, when abutting the base seal surface 45, is compressed and acts as a Belleville spring to hold the dispensing end of the outlet spout 17 to the base latch surface 46.

FIGS. 1 through 18 show the rigid outlet spout 17 with a projection 21 to facilitate easy manual movement from the sealing position.

Figure 19:
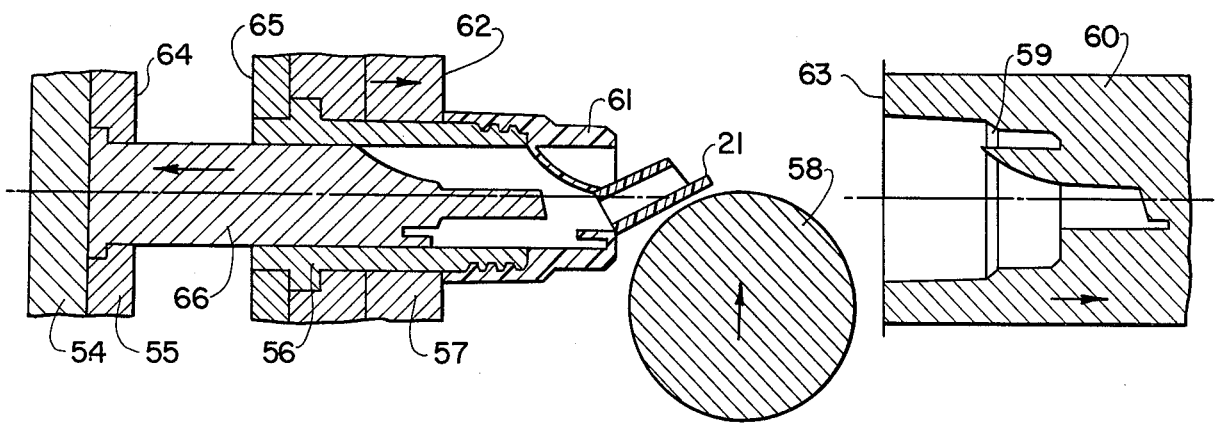
FIG. 19 is a broken away sectional view of a mold, mold wipe and closure during the molding cycle with the mold wipe in the process of traversing the mold and thus move the dispensing spout of the closure to the sealed position.

Referring to FIG. 19, the device is adapted to be molded in the dispensing position and moved to the sealed position during the molding cycle. The molding cycle consists of the mold closing with surface 63 of cavity 60 contacting a stripper plate having a surface 62 and an ejector half surface 64 which contacts an ejector surface 65. In this position plastic is injected into the cavity 59 to form a molded closure. After cooling, the surfaces 62 and 63 separate. Then, plates 54 and 55 move back to separate surfaces 64 and 65 and retract a core 66. A mold wipe 58 traverses the surface of the mold in the direction indicated by the arrow on wipe 58, and contacts the rigid outlet spout to move the spout 17 to the sealed position. The stripper plate 57 moves forward and ejects the molded part from the mold and off of the core 56. This eliminates the necessity for any secondary operation to close the rigid outlet spout 17, and has the additional advantage that the mechanical flexing of the tinged connection at the bi-sector plane 43 and hinge 50 during the molding cycle, orients the molecules of the preferred polyolefin material to insure long hinge life.

The necessity for an additional cap over the closure is eliminated by devices in accordance with the invention, unlike many prior devices.

The device in accordance with the invention has been found to have particular application for use with lotions, conditioners, oil, detergents, etc., as well as for capless toothpaste tubes. More particularly, when used with toothpaste tubes the device reduces the total cost, because it may be manufactured more inexpensively than the conventional toothpaste tube and cap. The device is also adapted for dispensing salt and pepper, the double seal of the device of the invention being particularly advantageous for dispensing salt, because this embodiment minimizes the difficulties resulting from the well-known hygroscopic characteristic of salt. Other applications are for dispensing sugar, pills, or as irrigation emitters which allow leakage at a slow rate such as one gallon per hour. The latter apparatus may be opened for flushing of the flow passage. The device may also be used as a valve to provide various manifold structures with multiple closures for turning on and off air and hydraulic fluid flow.

The invention has been described with reference to its illustrated preferred embodiments. Persons skilled in the art of sealing closures may upon exposure to the teachings herein, conceive variations in the mechanical development of the components therein. Such variations are deemed to be encompassed by the disclosure, The invention being delimited only by the appended claims.

The inventor claims:

1. A unitary dispensing closure and valve for cooperation with an associated container, comprising:
   a rigid base defining a seal surface and a rigid latch surface,
   a rigid spout having a dispensing passage, a first end portion connected with the rigid base at a rectilinear pivot line hinge, and a dispensing second end portion,
   an invertible diaphragm connected to the outlet spout by a first hinge continuous with the pivot line and defining therewith a continuous hinge about the spout first end portion, said invertible diaphragm being connected to the rigid base by a second hinge,
   said pivot line and said second hinge defining a continuous hinge disposed in a common bi-sector plane which bisects an angle between said rigid base seal surface and inside surface of the outlet spout when the spout is in its dispensing position, said pivot line, first hinge and second hinge cooperating to invert the invertible diaphragm during pivoting movement of the outlet spout about the pivot line between its sealed and dispensing positions, the movement of the outlet spout to the sealed position being governed by pivoting of the spout about said rectilinear pivot to collapse the invertible diaphragm through the bi-sector plane, said invertible diaphragm being disposed in a convexed configuration when the spout is in its dispensing position and being disposed in a concaved configuration when the spout is in its sealed position,
   resilient fluid seal means configured and positioned to provide sealing between the base seal surface and the first end portion of the outlet spout about said dispensing passage when the outlet spout is in its said sealed position, and means on said base for attaching the closure to the associated container.

2. A unitary dispensing closure and valve for cooperation with an associated container, comprising:
   a rigid base defining a seal surface and a rigid latch surface,
   a rigid spout having a dispensing passage, and first end portion connected with the rigid base at a pivot line hinge, and a dispensing second end portion,
   resilient fluid seal means on the first end portion of the outlet spout about said dispensing passage,
   an invertible diaphragm connected to the outlet spout by a first hinge continuous with the pivot line and connected to the rigid base by a second hinge,
   said pivot line and said second hinge defining a continuous hinge disposed in a common bi-sector plane which bisects an angle between said rigid base seal surface and an inside surface of the outlet spout when the spout is in its dispensing position, said pivot line, first hinge and second hinge cooperating to invert the invertible diaphragm during pivoting movement of the outlet spout about the pivot line between its sealed and dispensing positions, the movement of the outlet spout to the sealed position collapsing the invertible diaphragm through the bi-sector plane, said invertible diaphragm being disposed in a convexed configuration when the spout is in its dispensing position and being disposed in a concaved configuration when the spout is in its sealed position,
   said resilient fluid seal means being seated against the base seal surface when the outlet spout is in sealed position, and urging the dispensing end of the outlet spout to abut and interengage with the rigid base latch surface, and
   means on said base for attaching the closure to the associated container.

3. A closure and valve according to claim 1 or 2, wherein:
   said outlet spout has a projection to overlap and extend beyond a portion of the rigid base with the spout in sealed position to provide for convenient manual lifting.

4. The device of claim 1 or 2, wherein:
   said rigid base latch surface includes detent means to interlock with said rigid outlet spout dispensing end portion to provide positive latching.

5. The closure and valve of claim 1 or 2, wherein:
   said seal is a cup seal having its smaller end portion on said inside surface of the outlet spout about the dispensing passage, and
   said seal is compressed when in contact with the rigid base seal surface to compensate for any minor irregularity in the base seal surface and provide a unidirectional pressure compensating seal, whereby increase in pressure of the fluid in the container increases seal seating pressure.

6. The closure and valve of claim 1 or 2, wherein:
   said invertible diaphragm is convexed when the rigid outlet spout is in the dispensing position and concaved when it is in the sealed position, and pressure exerted by the fluent contents in the associated container acts upon the inside surface of the invertible diaphragm to increase the seal seating pressure.

7. The closure and valve of claim 1 or 2, wherein:
   said invertible diaphragm is configured to be stable and substantially unstressed in convexed or concaved configuration, and to be stressed when forced and flexed through said bi-sector plane during opening or closing, thus developing dynamic forces to exert pressure in the sealed position of the spout to hold said outlet spout seal against the seal surface of the rigid base, the external force required to lift the outlet spout past said bi-sector plane producing dynamic forces in the invertible diaphragm to urge the outlet spout toward the dispensing position.

8. The device of claim 1 or 2, wherein:
   said rigid outlet spout is pivoted through said bi-sector plane from a dispensing position to a sealed position during the molding cycle to orientate the molecules of the polyolefin plastic in the flexed hinge areas to insure long hinge life.

9. The device of claim 6, wherein:
   said invertible diaphragm is a hollow conic section which in its convexed configuration has increased inside surface area so that when pressure is exerted on the inside of the dispensing cap by the fluid contents within the associated container this larger area distributes the pressure along the bi-sector plane to increase the seal seating pressure.

10. The device of claim 6, wherein:
    said invertible diaphragm has a multi-faceted shape which is disposed in convexed configuration when said rigid outlet spout is disposed in the dispensing position and in concaved configuration when the rigid outlet spout is disposed in the sealed position.

11. The device of claim 6, wherein:

said invertible diaphragm has a conical shape which is disposed in a convexed configuration when said rigid outlet spout is disposed in said dispensing position and in concaved configuration when said rigid outlet spout is disposed in said sealed position.

12. The device of claim 6, wherein:
said invertible diaphragm has a dome shape which is convexed when said rigid outlet spout is disposed in said dispensing position and concaved when said rigid outlet spout is disposed in the sealed position.

13. The device of claim 6, wherein:
said invertible diaphragm is conical and domed, and said invertible diaphragm is convexed when said rigid spout is disposed in said dispensing position and concaved when said rigid outlet spout is disposed in said sealed position.

14. The device of claim 6, wherein:
said invertible diaphragm is at least partly multifaceted and is convexed when said rigid outlet spout is disposed in said dispensing position and concaved when said rigid outlet spout is disposed in said sealed position.

15. The device of claim 6, wherein:
said invertible diaphragm is at least partly conical and is convexed when said rigid outlet spout is disposed in said dispensing position and concaved when said rigid outlet spout is disposed in said sealed position.

16. The device of claim 6, wherein:
said invertible diaphragm is at least partly domed and is convexed when said rigid outlet spout is disposed in said dispensing position and concaved when said rigid outlet spout is disposed in said sealed position.

17. The device of claims 1 or 2, wherein:
said first and second hinges have a thickness less than the remainder of said invertible surface and have widths adapted not to impede the inverting of the invertible diaphragm.

18. The device of claim 1, wherein:
said rigid outlet spout dispensing passage is round in cross section.

19. The device of claim 1, wherein:
said rigid outlet spout exterior configuration is round.

20. The device of claim 1, or 2, wherein:
said rigid outlet spout has an inclined dispensing end portion to serve as a lead-in upon engaging the rigid base latch surface during movement to sealed position.

21. The device of claim 1 or 2, wherein:
said device is manufactured of a polyolefin plastic.

22. The device of claim 21, wherein:
said device is molded in the dispensing configuration and prior to ejection thereof from the mold a core is retracted and a mold wipe traverses the outlet spout to urge it into the sealed position, whereby any secondary operation is eliminated and the polyolefin molecules are oriented to insure long hinge life.

23. The closure and valve according to claim 2, wherein:
said seal is resilient and upon said seating thereof against the base seal surface urges said outlet spout dispensing end portion into engagement with the rigid base latch surface.

24. The closure and valve according to claim 1 or 2, wherein:
said seal is resilient, and
said spout is displaced against the seal during movement into its sealed position and is thereby urged against the rigid base latch surface.

25. The closure and valve according to claim 5, wherein:
said cup seal is configurated to seal as a suction cup in the sealed position of the spout and to act as a Belleville spring during movement of the spout to its sealed position to accommodate displacement of the outlet spout and then to urge the outlet spout into interengagement with the rigid base latch surface.

26. The closure and valve according to claim 1 or 2, wherein:
said seal being partially compressed from its molded configuration while in its sealed position.

27. The device of claim 7, wherein:
said rigid outlet spout is pivoted through said bi-sector plane from a dispensing position to a sealed position during the molding cycle to orientate the molecules of the polyolefin plastic in the flexed hinge areas to insure long hinge life.

28. The device of claim 7, wherein:
said invertible diaphragm is a hollow conic section which in its convexed configuration receives pressure exerted on the inside of the dispensing cap by the fluid contents within the container and distributes the pressure along the bi-sector plane to increase the seal seating pressure.

29. The device of claim 7, wherein:
said first and second hinges have a thickness less than the remainder of said invertible surface and have widths adapted not to impede the inverting of the invertible diaphragm.

30. The device of claim 6, wherein:
said first and second hinges have a thickness less than the remainder of said invertible surface and have widths adapted not to impede the inverting of the invertible diaphragm.

31. The device of claim 9, wherein:
said device is manufactured of a polyolefin plastic.

* * * * *